United States Patent [19]

Bauer et al.

[11] 4,331,209

[45] May 25, 1982

[54] VENTILATION SYSTEM FOR ELECTRIC VEHICLES

[75] Inventors: James J. Bauer, Richland; William M. Wart; Howard C. Hansen, both of Battle Creek, all of Mich.

[73] Assignee: Clark Equipment Company, Buchanan, Mich.

[21] Appl. No.: 125,963

[22] Filed: Feb. 29, 1980

[51] Int. Cl.³ ............................................. B60H 3/04
[52] U.S. Cl. .............................. 180/54 A; 180/65 R; 310/63
[58] Field of Search ........................ 180/54 A, 65 R; 318/139, 345 C, 345 G; 165/51, 139; 310/58, 62, 63, 112, 114, 211; 285/DIG. 19; 297/102, 166, 169

[56] References Cited

U.S. PATENT DOCUMENTS

| | | | |
|---|---|---|---|
| 2,469,820 | 5/1949 | Fuge | 310/58 |
| 2,591,408 | 4/1952 | Crankshaw | 310/58 X |
| 2,797,940 | 7/1957 | Michener, Jr. et al. | 285/DIG. 19 |
| 3,229,896 | 1/1966 | Levy | 310/63 X |
| 3,819,965 | 6/1974 | Schoendube | 310/58 |
| 3,821,937 | 7/1974 | Seesselberg | 310/58 X |
| 4,026,349 | 5/1977 | Schaap | 165/41 |
| 4,054,817 | 10/1977 | Gurwicz et al. | 318/139 X |
| 4,092,556 | 5/1978 | Mabuchi | 310/57 |
| 4,227,132 | 10/1980 | Cavil et al. | 318/139 X |

*Primary Examiner*—Joseph F. Peters, Jr.
*Assistant Examiner*—Michael Mar
*Attorney, Agent, or Firm*—Marmaduke A. Hobbs

[57] ABSTRACT

A ventilation system for electric vehicles in which a fan draws air into a housing surrounding the pump motor. A portion of the air entering the housing flows through ports in the pump motor to cool the motor before leaving the system through an exit port in the motor. The remainder of the air drawn into the housing flows through a duct and into a manifold from where a portion of the air flows through ports in the drive motor to cool the drive motor, a portion of the air flows through a duct to the pump motor S.C.R. control, and the remainder of the air flows through a duct and into the drive motor S.C.R. control, for cooling those units. A filter may be provided over the intake for the fan to prevent dust and other contaminants from reaching the motors and control mechanisms, thus minimizing the risk or fouling of the motors and controls.

12 Claims, 3 Drawing Figures

VENTILATION SYSTEM FOR ELECTRIC VEHICLES

Industrial vehicles, such as fork lift trucks and the like, are commonly electrically powered, having electric drive motors and electric lift or pump motors. In selecting motors to be used in such vehicles, consideration must be given to the desired performance, such as the required torque, rpm and horsepower outputs for lift and travel, and the electric motor must be sized to meet these requirements. An inherent characteristic of electric motors is that heat is generated during the operation of the motor and, as the motor heats up, failure or "burn-out" of the motor may result if the heat is not dissipated and operating temperatures become excessive. Thus, when selecting a motor for use in fork lift trucks, consideration must also be given to the thermal capacity of the motor, in that a motor having the desired output capabilities may not have the required thermal capacity needed for prolonged use in a warm environment, such as is often found in factories or warehouses. This problem is increased by the fact that design requirements often dictate that the motors be mounted in enclosed areas, or that they be covered for protection and/or appearance purposes, resulting in decreased ventilation. This increases the operating temperature in the motor area, thus making necessary the use of motors having high thermal capacities which will provide the output levels required and tolerate prolonged high temperature operation.

The enclosed mounting of motors, and the fact that much of the work cycle of a fork lift truck is done either at rest or at slow speeds and high torque output, make unforced ambient air ventilation impractical. The non-moving or only slightly turbulent air surrounding the motors heats up as the motors do, and does not remove the heat which is generated during operation of the vehicle. A fan wheel located inside the electric motor has commonly been used to achieve ventilation by drawing the ambient air through the motor. This approach is acceptable if some high speed runs are involved in the work cycle of the truck so that more cooling air passes through and around the motor. If, however, the truck is used mostly for slow speed or short run operations at high torque outputs, adequate ventilation is not achieved by this method. Further, the fan wheels do not provide ventilation for the solid state electronic controls for the electric motors which also produce heat and therefore also must be cooled in some manner. Temperature sensing circuitry is often used to protect the silicon control rectifiers by limiting current values before damage results. Thus, at temperatures higher than safe levels, reduced performance results. Cooling these units prevents loss of peak performance. Adequate ventilation of the electric motors and the S.C.R. controls will result in motors and controls having lower thermal capacities being suitable for supplying the necessary levels of performance. The units with lower thermal capacities, if ventilated properly, will not overheat to the point of decreased performance or failure, but will continue to function at or near required performance levels.

It is therefore one of the principal objects of the present invention to provide a ventilation system for electric vehicles which will adequately cool the pump and drive motors and which will cool the S.C.R. controls for the motors, thereby making possible the use of smaller motors and controls having the necessary maximum output capabilities but having lower thermal capacities than those presently used in these vehicles.

Another object of the present invention is to provide a ventilation system for electric vehicles, which has a filter so that dirt and other contaminants are kept from the motors and controls to reduce fouling of these units by contaminant particles, and which minimizes the risk of fire resulting from sparks given off by the electric motors by filtering out combustible particulates in the circulating air.

A further object of the present invention is to provide a ventilation system for electric vehicles, which is simple in design and requires only one fan to cool the pump motor, drive motor and S.C.R. controls, and which has a one piece manifold to connect the motors and controls in the ventilation system, and will provide a continuous ventilating air flow through the motors and controls regardless of the conditions under which the vehicles are operated.

A still further object of the present invention is to provide a ventilation system for electric vehicles which will hold the drive motor and drive motor S.C.R. control at relatively stable temperatures so that significant temperature fluctuations do not occur between the work phase and idle phase of operation of the motor and control, and which will cool the pump motor proportionally to its requirements, dependent upon the use of the lift mechanism of the vehicle.

Yet another object of the present invention is to provide a ventilation system for electric vehicles in which the ducts of the system can be installed easily and quickly in a minimal amount of time, and which will form an air tight seal between the duct and motor or control even when variations exist in the space between the duct and the motor or control on which it is to be installed.

Additional objects and advantages of the present invention will be apparent from the following detailed description and the accompanying drawings wherein.

Figure 1:
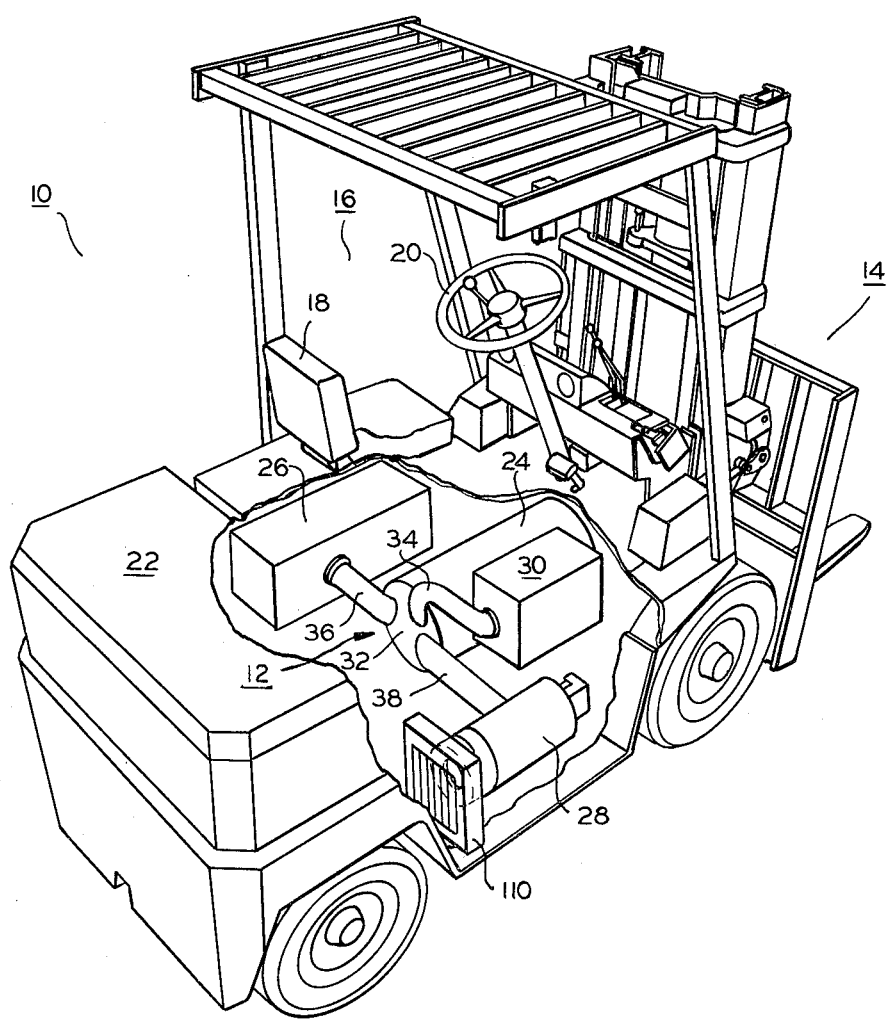
FIG. 1 is a perspective view of a fork lift truck, partially broken away to reveal a ventilation system embodying the present invention installed therein.
Figure 2:
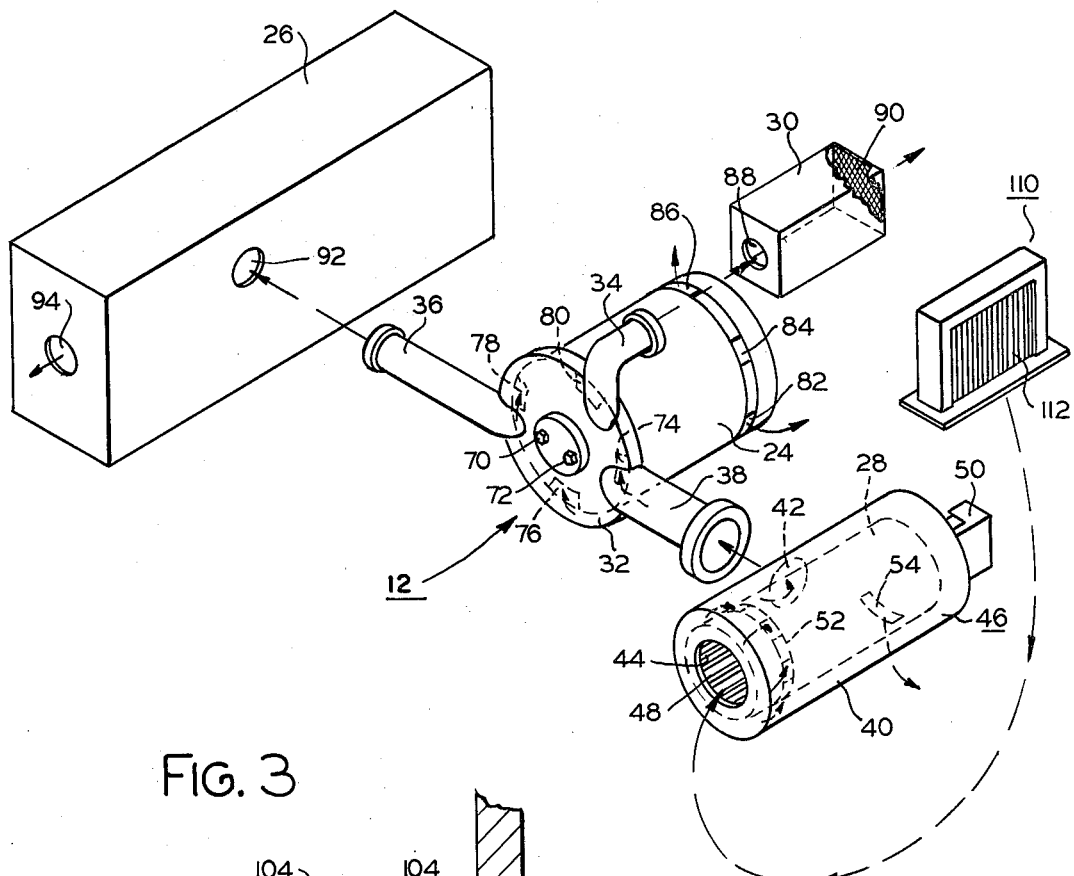
FIG. 2 is an exploded perspective view of the ventilation system for electric vehicles shown in FIG. 1, having some of the concealed parts shown in broken lines.

Referring more specifically to the drawings, and to FIG. 1 in particular, numeral 10 designates a fork lift truck having a ventilation system 12 embodying the present invention installed therein. Truck 10 has a carriage and lift arms designated generally by numeral 14 and an operator's area 16 having a seat 18 and steering wheel 20. Enclosed in a housing 22 are a drive motor 24, drive motor S.C.R. control 26, pump motor 28, and pump motor S.C.R. control 30, which are all cooled by ventilation system 12. While a lift truck is referred to herein for the purpose of illustrating the present invention, the ventilating system may be used advantageously on other types of vehicles and equipment.

Ventilation system 12 includes a manifold 32 connected to drive motor 24 and ducts 34, 36 and 38 extending from the manifold and forming an integral unit therewith. Duct 38 is connected to a housing 40 having an opening 42 which permits the passage of air between the housing and the duct. A squirrel cage fan 44 and the pump motor 28 of truck 10 are concentrically mounted within housing 40, and the fan 44 is shaft mounted on the pump motor 28 to be operated thereby. The internal diameter of housing 40 is sufficiently larger than the external diameter of pump motor 28 so that an air circulation space 46 is provided between the pump motor and the housing. An opening 48 in one end of housing 40 permits fan 44 to draw ambient air into the housing, to be distributed throughout the ventilation system for cooling the heat generating components of the truck. Pump motor 28 also drives a hydraulic pump 50 which is mounted on the end of the pump motor opposite fan 44. Pump motor 28 and pump 50 are in continuous operation when the vehicle is being used, supplying oil pressure for all hydraulic functions of the vehicle, including power steering. Hence, fan 44, being shaft mounted on pump motor 28, will also be in continuous operation, drawing ambient air through opening 48 and into the ventilation system. Pump motor 28 has an internal fan wheel and annular openings 52 near the location of the brushes of the motor so that the internal fan wheel can draw air into the motor and circulate the air therethrough to cool the motor, ultimately discharging the air through a vent 54 which allows the air to pass completely out of the ventilation system.

Manifold 32 is mounted on one end of drive motor 24 by bolts 70 and 72 and receives air through duct 38 brought into the system by fan 44. The drive motor has end openings 74, 76, 78, and 80 which serve as inlets through which air from manifold 32 can enter the drive motor and flow axially therethrough to cool the motor. Discharge vents, such as 82, 84 and 86, are disposed circumferentially around the opposite end of drive motor 24 from the end openings, and the air flowing through the drive motor leaves through the discharge vents. Duct 34 extending from manifold 32 is connected to the pump motor S.C.R. control 30, which has an inlet opening 88 and a discharge vent 90 so that air from the manifold can flow through duct 34 and inlet 88 into pump motor S.C.R. control 30 to cool the electronic components therein, and leave the control through vent 90. Duct 36 is connected to the drive motor S.C.R. control 26, which has an inlet opening 92 and a discharge vent 94 so that air from manifold 32 can flow through duct 36 and inlet 92 into the drive motor S.C.R. control 26 to cool the electronic components therein, and leave the control through vent 94.

Figure 3:
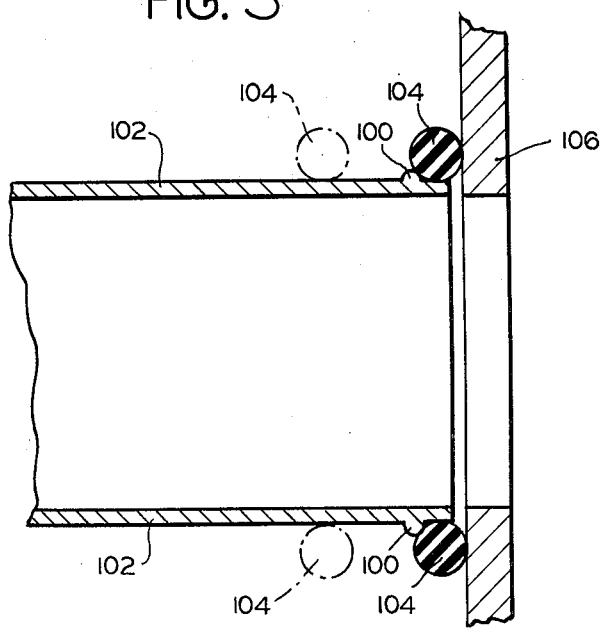
FIG. 3 is an enlarged cross sectional view of one of the air tight seals between a duct of the ventilation system and one of the components to be ventilated, with the presealed position of the sealing ring being shown in broken lines.

To operate most efficiently, air tight seal connections should be made between ducts 34, 36 and 38 and pump motor S.C.R. control 30, drive motor S.C.R. control 26, and housing 40, respectively, to minimize the air loss at the connections and thereby retain substantially all of the air drawn into the system by fan 44 to cool the heat generating components. FIG. 3 shows the seal connection used in the ventilation system shown, which will create an air tight seal between the duct and the component to which it is attached, and will do so even if considerable variations exist in the distance between the duct and the component. Each of the previously mentioned connection joints is sealed in a similar manner; thus, the embodiment shown in FIG. 3 is applicable to each. A bead 100 is disposed on the outer surface of the duct wall 102 near the end of the duct. An O-ring 104 made of rubber is disposed between bead 100 and the wall 106 of the component. During installation of the manifold and duct, O-ring 104, as shown in broken lines, is ready to be installed in sealing relationship with a component, and as it is installed, it is rolled forward over bead 100 to seat it between the bead and wall 106 of the components, to complete the seal assembly.

Frequently, electric fork lift trucks and the like are used in environments where dust particles are prevalent in the air and, if the dust or other atmospheric materials are flammable or highly corrosive, damage can occur to the motors and S.C.R. controls unless the air is first filtered. For this reason, a filter 110, having a suitable filter element 112 to remove the type of particles found in the working environment, may be disposed in front of opening 48. The ambient air drawn into the system by fan 44 must pass through filter element 112, which will remove the particles from the air and provide clean and filtered air for the ventilation system. This will prevent flammable particles from being ignited by the arcing occurring in the electric motors, and will keep corrosive materials from damaging the motors or delicate electronic components in the S.C.R. controls.

In the use and operation of a ventilation system for electric vehicles embodying the present invention, manifold 32 and ducts 34, 36, and 38 form an integral unit which is attached to drive motor 24 by bolts 70 and 72. Ducts 34, 36 and 38 are preshaped to bring the ends of the ducts in proximity with the openings of drive motor S.C.R. control 26, lift motor S.C.R. control 30, and housing 40. The ducts need not be in full flush contact with the components to which they are to be attached, since O-ring 104 will form an air tight seal even if close tolerances have not been achieved between the component and the duct. During positioning of system 12, O-ring 104 is in the retracted position shown by the dotted lines in FIG. 3. When manifold 32 has been secured to drive motor 24, O-ring 104 is rolled over bead 100 to seat it between the bead and wall 106 of the component, thus forming an air tight seal.

Pump motor 28 will operate continuously during any function of the vehicle, since pump 50 must be operational to supply hydraulic pressure when the venicle is being used. Since squirrel cage fan 44 is mounted on the shaft of pump motor 28, the fan operates whenever the pump motor operates. Air is drawn into the system through filter 110 and opening 48 of housing 40 and flows within space 46 between pump motor 28 and the housing. Some of the air will be drawn through opening 52 in motor 28 and will pass through the motor and leave the system through vent 54 after having cooled the motor. Most of the air drawn into the system will pass through opening 42 and duct 38 into manifold 32. The air is divided in the manifold and takes three routes. Some will pass through duct 34 and inlet 88 into pump motor S.C.R. control 30, passing therethrough to cool the electronic components therein and leaving the control at discharge vent 90. Some of the air will pass through end openings 74, 76, 78 and 80 of drive motor 24 and will flow axially therethrough to cool the motor and leave the motor and system through discharge vents 82, 84 and 86. The remainder of the air entering manifold 32 will flow through duct 36 and inlet 92 into drive motor S.C.R. control 26, circulating therethrough to cool the S.C.R. control components, and eventually leaving the control through discharge vent 94.

Since fan 44 will be operational whenever the vehicle is being used, a continuous supply of ventilating air is brought into the system and continuous cooling is provided for the drive motor, pump motor and S.C.R.

controls. The continuous cooling of the drive motor and drive motor S.C.R. control, which normally are used intermittently during operation of the vehicle, will keep the drive motor and drive motor S.C.R. control at a relatively constant temperature. Temperature fluctuations will be lessened and held within acceptable limits. Another advantage of the present ventilation system is that pump motor 28 is cooled in relation to its use, and therefore in accordance with cooling requirements. Under normal conditions the pump motor 28 rotates rather slowly if, for example, only the power steering of the vehicle is being utilized; however, when a heavy load is lifted by the truck, or other hydraulic functions of the vehicle are used, the motor will increase its rpm output accordingly; thus, the higher heat levels will be generated. As the motor turns more rapidly, the interior fan wheel of the motor will also turn more rapidly and will increase the air flow through motor 28 thereby providing an increased amount of air to cool the motor.

Although one embodiment of a ventilation for electric vehicles has been described in detail herein, various changes may be made without departing from the scope of the present invention.

We claim:

1. A ventilation system in combination with an electric vehicle having a pump motor for driving a hydraulic pump to supply pressurized hydraulic fluid for hydraulic functions of the vehicle, a pump motor S.C.R. control, a drive motor for propulsion of the vehicle and a drive motor S.C.R. control, said ventilation system comprising an air intake means driven by the pump motor continuously during operation of the vehicle for supplying ambient air to said system, an air flow means interconnecting said intake means and the pump motor for providing a portion of the air supplied by said intake means for cooling the pump motor, a first duct connected to said intake means for directing the flow of the remainder of the ambient air supplied by said intake means, a manifold connected to said first duct for receiving the air passing through said first duct, an air flow means interconnecting said manifold and the drive motor for supplying a portion of the air entering said manifold for cooling the drive motor, a second duct interconnecting said manifold and the drive motor S.C.R. control for supplying a portion of the air entering said manifold for cooling the drive motor S.C.R. control, and a third duct interconnecting said manifold and the pump motor S.C.R. control for supplying a portion of the air entering said manifold for cooling the pump motor S.C.R. control.

2. A ventilation system as defined in claim 1 in which said first mentioned air flow means includes a housing around the pump motor and in spaced relation thereto for receiving air from said intake means to circulate around the pump motor.

3. A ventilation system as defined in claim 2 in which said intake means includes a squirrel cage fan operated by the pump motor and concentrically mounted with the pump motor in said housing on the opposite end of the pump motor from the pump driven by the pump motor, and an intake opening in said housing through which ambient air is drawn into said housing by said squirrel cage fan.

4. A ventilation system as defined in claim 1 in which said manifold is mounted on said drive motor and said second mentioned air flow means includes an opening in said manifold through which air from said manifold flows into the drive motor.

5. A ventilation system as defined in claim 3 in which said manifold is mounted on said drive motor and said second mentioned air flow means includes an opening in said manifold through which air from said manifold flows into the drive motor.

6. A ventilation system as defined in claim 1 in which said manifold and said three mentioned ducts are integrally connected.

7. A ventilation system as defined in claim 5 in which said manifold and said three mentioned ducts are integrally connected.

8. A ventilation system as defined in claim 1 in which sealing means are provided forming air tight connections between said ducts, S.C.R. controls and intake means, and each of said sealing means includes a bead near the end of each of said ducts and an O-ring for seating between said bead and the component to which said duct is connected.

9. A ventilation system as defined in claim 7 to which said manifold is attached to the drive motor, sealing means are provided forming air tight connections between said ducts, S.C.R. controls and intake means, and each of said sealing means includes a bead near the end of each of said ducts and an O-ring for seating between said bead and the component to which said duct is connected.

10. A ventilation system as defined in claim 3 in which a filter is disposed over said intake opening.

11. A ventilation system in combination with an electric vehicle having a plurality of heat generating components located remotely from each other in the vehicle, said vehicle having a drive motor, one of the heat generating components being a pump motor for driving a hydraulic pump, which pump motor operates continuously when the vehicle is in use to supply pressurized hydraulic fluid for functions of the vehicle; said ventilation system comprising a housing connected to said pump motor, a fan disposed in said housing opposite the pump driven by the pump motor, and connected to the pump motor for continuous operation when the vehicle is in use, an air intake means in said housing through which air is drawn into said housing by said fan, means for directing a portion of the air entering said housing to the pump motor for cooling the pump motor, air flow means connected to said housing for directing the remainder of the air entering said housing to the other heat generating components, air distributing means for dividing the air entering said air flow means between the other heat generating components, and exhaust means through which the air from the heat generating components is expelled.

12. A ventilation system as defined in claim 11 in which said fan is a squirrel cage fan.

* * * * *